United States Patent

[11] 3,617,862

| | | |
|---|---|---|
| [72] | Inventor | Frederick A. Stich<br>Milwaukee, Wis. |
| [21] | Appl. No. | 889,639 |
| [22] | Filed | Dec. 31, 1969 |
| [45] | Patented | Nov. 2, 1971 |
| [73] | Assignee | Allis-Chalmers Manufacturing Company<br>Milwaukee, Wis. |

[54] ARCLESS LOAD TAP CHANGING APPARATUS
29 Claims, 16 Drawing Figs.

[52] U.S. Cl. .......................................................... 323/43.5 S,
317/11
[51] Int. Cl. .......................................................H02p 13/06,
G05f 1/14
[50] Field of Search............................................ 323/43.5,
43.5 S; 13/12, 13; 317/11

[56] References Cited
UNITED STATES PATENTS

| 3,531,713 | 9/1970 | Goldberg et al. | 323/43.5 S |
|---|---|---|---|
| 3,437,913 | 4/1969 | Matzl | 323/43.5 |
| 3,493,664 | 2/1970 | Kapell | 13/12 |
| 3,502,961 | 3/1970 | Matzl | 323/43.5 |
| 3,515,980 | 6/1970 | Throop | 323/43.5 |

Primary Examiner—Gerald Goldberg
Attorneys—Lee H. Kaiser, Robert B. Benson and Thomas F. Kirby ABSTRACT: A load tap changing voltage regulator has a dial type tap-changing switch and an odd-even switch integral therewith having first and second pairs of contacts connected in series with first and second rotatable tap changer contacts forming first and second load circuits, and the odd-even switch contacts open before the corresponding tap changer rotatable contact disengages a stationary contact and close after it engages a succeeding stationary contact. A pair of oppositely poled thyristors are connected across the first and second load circuits. First and second current transformers are connected in the first and second load circuits and energize bridge rectifiers which supply gating current to the thyristors and also indicate whether the load circuits are open or closed. RC time delay circuits responsive to the opening of either load circuit remove the gating signals to the thyristors after a predetermined time delay, thus assuring that the tap changer switch contacts and the odd-even switch contacts do not interrupt current and that the current is commutated off by the thyristors at current zero. Shunt regulators between the bridge rectifiers and the cathode-gate circuits of the thyristors regulate the power dissipation of the gate circuits, and the shunt control elements are biased in the active region to permit gating current to flow to the thyristors when both load circuits are closed and they are biased into saturation to shunt gating current from the thyristors a predetermined interval subsequent to the opening of either of the pairs of odd-even switch contacts.

PATENTED NOV 2 1971

Inventor
Frederick A. Flick
By Lee H. Kaiser
Attorneys

ARCLESS LOAD TAP CHANGING APPARATUS

This invention relates to load tap-changing apparatus such as tap-changing voltage regulators and electrical transformers and in particular to such apparatus which change tapes without arcing at the tap changer contacts.

Arching between movable and stationary contacts during each switching cycle of a load tap changing apparatus such as a voltage regulator generates combustible gases within the casting, contaminates the oil and causes pitting and erosion of the contacts. Such arcing necessitates the use of a breather on the regulator casing which permits moisture, dust and other foreign material to enter the casing through the breather and further contaminate the oil. Further, the breather prevents installation of a voltage regulator in an underground location. The pitting and erosion and wear of the tap changer contacts necessitates taking the regulator out of service periodically for maintenance and, eventually, replacement of the contacts. Inspection and maintenance of the contacts may require untanking of the oil filled regulator, and this is time consuming and costly since it requires removal of cover bolts and lifting the heavy unit of the tank with a crane or portable inspection jack.

It is an object of the invention to provide improved load tap changing voltage regulator which eliminates arcing between tap changer contacts and thus minimizes generation of gas within the casing and contamination of the oil Another object is to provide such an improved load tap changing voltage regulator which does not require a breather on the casing and thus may be installed in an underground location and eliminates the problem of moisture, dust and foreign particles which entered into casings of prior art regulators through such a breather.

It is a further object of the invention to provide such an improved load-tap changing voltage regulator which eliminates arcing between contacts and minimizes maintenance required of the tap changer apparatus and the time that the apparatus is out of service.

It is a still further object of the invention to provide such an improved load-tap-changing voltage regulator which eliminates arcing between tap changer contacts and substantially extends the useful-operating life of the contacts.

Still another object of the invention to provide such an improved load-tap changing voltage regulator which changes taps without arcing between contacts regardless of the speed at which the tap change is made and does not require a quick-break mechanism to snap the movable contacts between tap positions.

A still further object of the invention is to provide such an improved arcless load-tap changing voltage regulator using controllable semiconductor devices to interrupt current during tap changes and wherein the danger of the semiconductor devices being subjected to damaging short circuit currents is minimal, thereby permitting use of semiconductor devices of lower power rating.

Still another object is to provide such an arcless load-tap changing voltage regulator using thyristors and which regulates the power dissipation in the gating circuits of the thyristors. These and other objects and advantages of the invention will be more readily apparent from the following detailed description when considered in conjunction with the accompanying drawing wherein:

FIGS. 8a through 8d schematically illustrate the relative timing of the currents and the switch contacts during a single tap change. The invention will be described as embodied in a load tap changing voltage regulator having a quick-break mechanism for actuating the rotatable contacts between tap positions of the type disclosed in U.S. Pat. No. 2,811,595 to A. H. Baguhn and 2,841,662 to William C. Sealey having the same assignee as this application, to which reference is made for details of construction, but it will be appreciated from the following description that a quick-break mechanism is not required and that tap changing can be accomplished in apparatus embodying the invention by any mechanism that will drive the movable contacts between tap positions and that the speed of changing taps is only limited by the speed of the drive mechanism for actuating the movable contacts.

Figure 1:
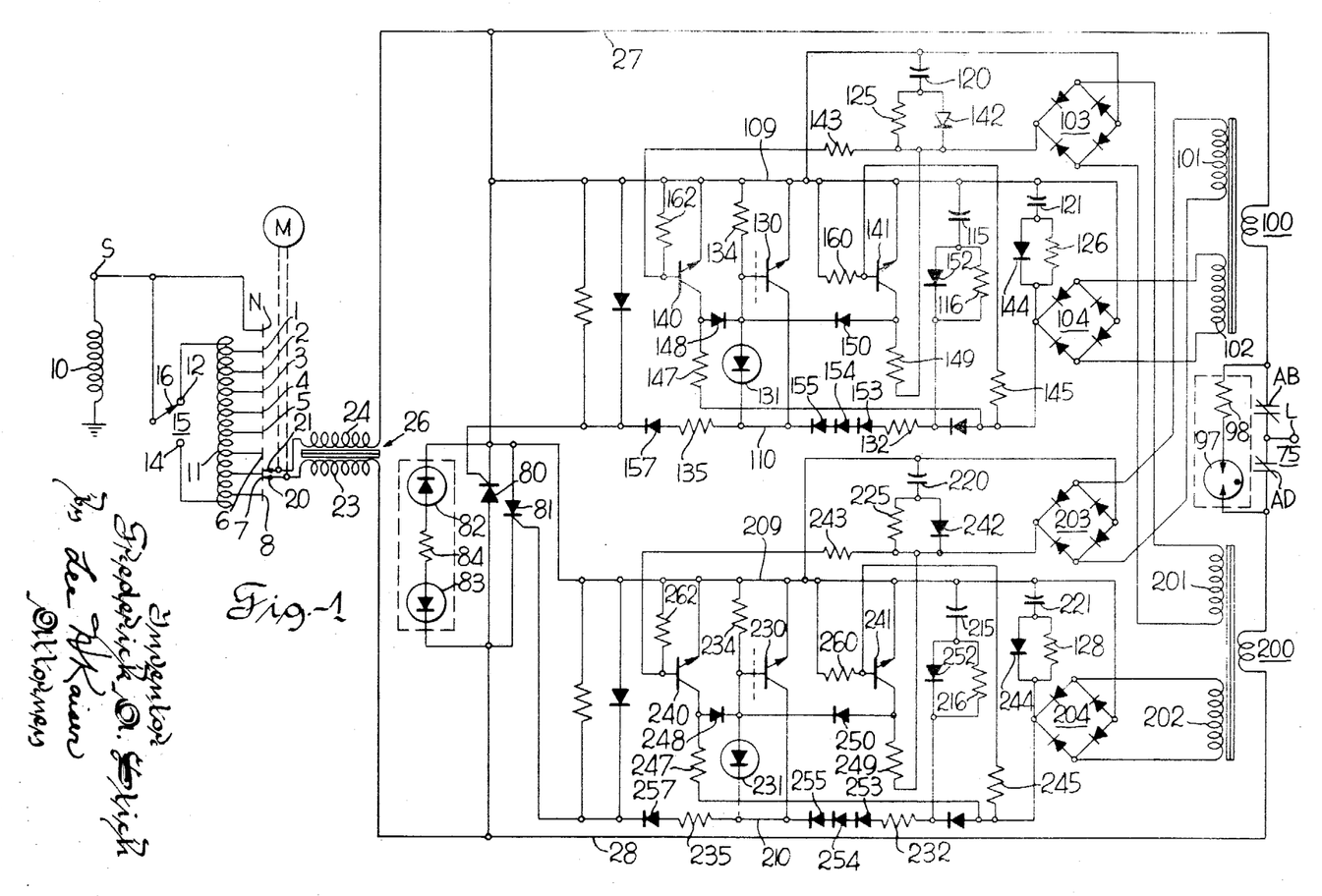
FIG. 1 is a schematic circuit diagram of a load-tap changing voltage regulator embodying the invention.

Referring to FIG. 1, a load-tap changing voltage regulator of the auto transformer type has a source terminal S adapted to be connected to an unregulated-alternating current power supply, an exciting, or shunt-winding 10 connected between the source terminal S and ground, and a series winding 11 having a plurality of taps connected to stationary contacts 1–8 and the neutral stationary contact N of dial-type load-tap changing switch. The regulator provides a regulated voltage to a load connected to load-bushing L, and the ends of series-winding 11 are connected to the stationary contacts 12 and 14 of a reversing switch 15 having movable contact 16 connected to the neutral stationary contact N and to exciting winding 10 and adapted to alternatively engage stationary contact 12 or 14 to connect series winding 11 in bucking or boosting relation to exciting winding 10.

The tap changer movable, or rotatable contacts 20 and 21 are adapted to sequentially engage the stationary contacts 1–8 and N and are connected through the windings 23 and 24 of a preventive autotransformer, or reactor 26 to the load-bushing L over conductors 27 and 28 respectively. The load tap changer is preferably a dial switch having the stationary contacts 1–8 and N arranged in a circle (see FIGS. 2, 3 and 7) and having the movable contacts 20 and 21 rotatable together about a common axis into sequential engagement with he stationary contacts and being adapted to assume both non-bridging tap positions, wherein both rotatable contacts 20 and 21 engage the same stationary contact and bridging tap positions wherein they engage adjacent stationary contacts. Stationary contacts 1–8 and N are arcuately spaced apart and each comprises a generally U-shaped metallic contact 30 (see FIGS. 3 and 5) having one leg brazed to 31 extending through an insulating panel 32 and electrically connected to the corresponding-winding tap. Each stationary contact 1–8 nd N may extend arcuately over approximately 30°. Each movable contact 20 and 21 has a pair of opposed resilient contact fingers 34 (see FIGS. 2, 3 and 5) at its radially outer end adapted to engage opposite sides of each stationary contact 1–8 and N. The movable contacts 20 and 21 are mounted in arcuately spaced relation on an insulating contact carrier 37 which is rotatable about a metallic collector hub 38 affixed to insulating panel 32 by metallic studs 39. The movable contacts 20 and 21 are preferably spaced by an angle such as 20° which is equal to the angle through which they move during each tap change and is greater than the angle between adjacent stationary contacts 30 to permit them to assume bridging tap positions.

Rotatable contact 20 has a pair of opposed resilient fingers 41 at its radially inner end which maintain continuous electrical engagement with collector hub 38 as contact carrier 37 rotates. Rotatable contact 21 has a pair of opposed resilient fingers 43 (see FIG. 2) at its radially inner end which maintain continuous electrical engagement with a metallic collector ring 44 affixed to insulating panel 32.

The invention will be described as having a quick-break mechanism for actuating rotatable contacts 20 and 21 between tap positions. The ends of the legs of a generally U-shaped mounting frame 51 are affixed to insulating panel 32. A stationary circular index plate 53 having circumferentially spaced notches 54 about its periphery is affixed by bolts to mounting frame 51 in spaced parallel relation to insulating panel 32. A main shaft 55 extends axially through index plate 53 and is affixed to mounting frame 51. A sprocket wheel 57 having external teeth is rotatable about main shaft 55 and is driven by a chain drive 58 actuated by a motor sprocket 59 mounted on the shaft of reversible motor M (see FIG. 3) which is energized to rotate sprocket wheel 57, and thus rotate movable contacts 20 and 21, in a direction to lower or raise the voltage supplied over conductors 27 and 28 to load-bushing L. The motor M may be controlled in known manner to rotate sprocket wheel 57 at uniform speed to change taps in a direction to maintain the voltage supplied over conductors 27 and 28 to load-bushing l within a desired voltage bandwidth.

An actuating, or interlock disk 60 rotatable about main shaft 55 if coaxial with and disposed between sprocket wheel 57 and contact carrier 37 so that interlock disk 60 rotates with contact carrier 37, and thus actuates movable contacts 20 and 21. Sprocket wheel 157 is connected to interlock disk 60 by two spring assemblies 65 (see FIG. 3) positioned symmetrically about main shaft 55. One end of each spring assembly 65 is attached to a pin 67 affixed to sprocket wheel 57 and its other end is attached to a pin 68 affixed to interlock disk 60 so that spring assemblies 65 are biased in both directions of rotation of sprocket wheel 57.

Actuating disk 60 is normally held stationary by a latch 70 which is pivotally attached to actuating disk 60 and extends through an arcuately elongated aperture 71 (see FIG. 6) in sprocket wheel 57 and engages one of the notches 54 in index plate 53. At the beginning of a tap change, sprocket wheel 57 is in a balanced position relative to actuating disk 60 so that neither spring assembly 65 is loaded and latch 70 is held in a notch 54 in index plate 53 by spring means (not shown). As sprocket wheel 57 is rotated at slow uniform speed by the motor M and chain drive 58, the spring assemblies 65 are biased since like ends of the spring assemblies 65 are attached to the rotating sprocket wheel 57, a cam surface 73 partially defining aperture 71 lifts latch 70 from the notch 54 in index plate 53, thereby permitting the biased spring assemblies 65 to rapidly rotate actuating disk 60, and thus snap contact carrier 37 and movable contacts 20 and 21 with a rapid motion to the succeeding tap position.

ODD-EVEN-SWITCH

The voltage regulator described hereinbefore is known and depends upon high speed of movement of the rotatable contacts 20 and 21 to effect rapid extinction of the arc drawn between the stationary and movable contacts. The arcless load-tap changing apparatus described herein having controllable semiconductor means to interrupt current in the load circuits permits movable contact 20 and 21 to engage or disengage from the stationary contacts 1-8 and N without arcing regardless of the speed at which such movable contacts 20 and 21 are actuated and while supplying current continuously to the load.

An odd-even switch 75 integral with the load tap changer dial switch and operated by the quick-break mechanism described above has a pair of normally closed contacts AB (see FIG. 1) in series with conductor 27 and a pair of normally closed contacts AD in series with conductor 28. Contacts AB and AD are between load bushing L and the movable tap changer contacts 21 and 20 respectively and open before a tap changer movable contact 20 or 21 disengages from a tap changer stationary contact 1-8 or N and close after the movable contact 20 or 21 engages the adjacent stationary contact in a manner analogous to a load transfer switch and also so that the tap changer contacts do not interrupt load current and also so that, even when one rotatable contact 20 or 21 is being moved between adjacent tap changer stationary contacts, the current is being supplied continuously to the load through the other rotatable tap changer contact 20 or 21 and the other pair of odd-even switch contacts. Thus a first load circuit is formed by the series arrangement of movable contact 20, reactor winding 23, conductor 28 and odd-even switch contacts AD, and a second load circuit is formed by the series arrangement of movable contact 21, reactor winding 24, conductor 27, and odd-even switch contacts AB. The term "odd-even" connotes that one pair of contacts AP or AD open when the movable contacts 20 and 21 are actuated to an odd-numbered tap position and the other pair of contacts AB or AD open when the movable contacts 20 and 21 are actuated to an even-numbered tap position.

Controllable semiconductor means which preferably comprise a pair of oppositely poled thryistors, or silicon controlled rectifiers, termed termed SCR's 80 and 81 are connected across the first and second load circuits and in shunt to the series arrangement of the odd-even switch contacts AB and AD, and gating signal control means 82 (see FIG. 1) are provided to gate SCR's 80 and 81 to the conductive state before the odd-even switch contacts AB or Ad open and to remove gating power from SCR's 80 and 81 subsequent to opening of odd-even contacts AB or AD so that the current carried by the tap changer rotatable contact 20 or 21 being switched is interrupted by SCR 80 or 81 at the next current zero and the odd-even switch contacts AB and AD never interrupt current.

The unitary odd-even switch and tap changer dial switch is disclosed in the copending application of Carl G. Whitman, Ser. No. 87,752 filed, Nov. 9, 1970 and having the same assignee as this invention. The electrically commoned contacts of the pairs of contacts AB and AD of odd-even switch 75, shown schematically in FIG. 1, preferable include an annular switch plate A affixed to and rotatable with contact carrier 37 and two pairs of electrically commoned contact fingers A' and A'' one of which is always in engagement with switch plate A as it rotates. Switch plate A has the same number of arcuately spaced radial projection 85 at its outer periphery as the tap changer has stationary contacts 1-8 and N, i.e., nine projections 85. The radial projections 85 may be in the same radial planes as the stationary contacts 1-8 and N but subtend a somewhat smaller arc, preferably approximately approximately 26°.

The pair of normally closed contacts AB of odd-even switch 75 shown schematically in FIG. 1 preferably also includes a pair of resilient fingers B attached to a metallic contact support 88 which is affixed by metallic studs 89 that extend through panel 32 and are electrically connected to conductor 27. Contact fingers B normally engage opposite sides of a radial projection 85 adjacent the trailing edge thereof in a clockwise direction of rotation, and they fall between adjacent projection 85 adjacent the trailing edge thereof in a clockwise direction of rotation, and they fall between adjacent projections 85 so that they are disengaged from odd-even switch plate A when plate A is rotated e.g. clockwise from the position shown in FIG. 2) to first open contacts AB of the odd-even switch 75 before rotatable tap changer contact 21 is disengaged for a stationary contact it is being actuated. The pair of contacts AD of odd-even switch 75 shown schematically in Fig. 1 preferably also includes a pair of resilient contact fingers D arcuately spaced from contact fingers B and attached to a similar metallic contact support 88 which is affixed by metallic studs (not shown) that extend through panel 32 and are electrically connected to conductor 28. Contact fingers D normally engage opposite sides of a radial projection 85 adjacent the leading edge thereof in a clockwise direction of rotation and they fall between adjacent projections 85 so that they are disengaged from plate A when plate A is rotated (e.g., counterclockwise from the position shown in fig. 2) to first open odd-even switch contacts AD before tap changer rotatable contact 20 is disengaged from a stationary contact when it is being actuated to a succeeding tap position.

Figure 2:
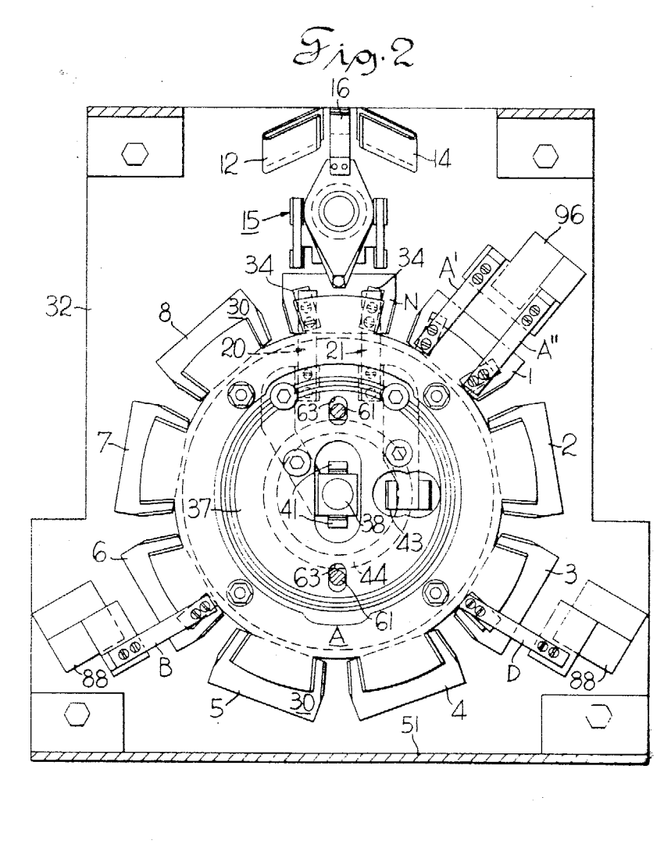
FIG. 2 is a view of the tap changer of the embodiment of FIG. 1 taken along line II—II of FIG. 3.
Figure 3:
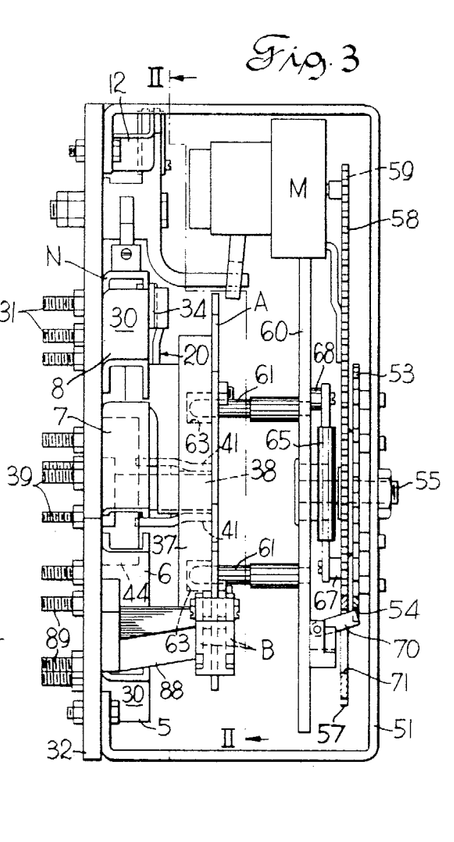
FIG. 3 is a side view of the tap changer shown in FIG. 2.
Figures 4, 5, 6:
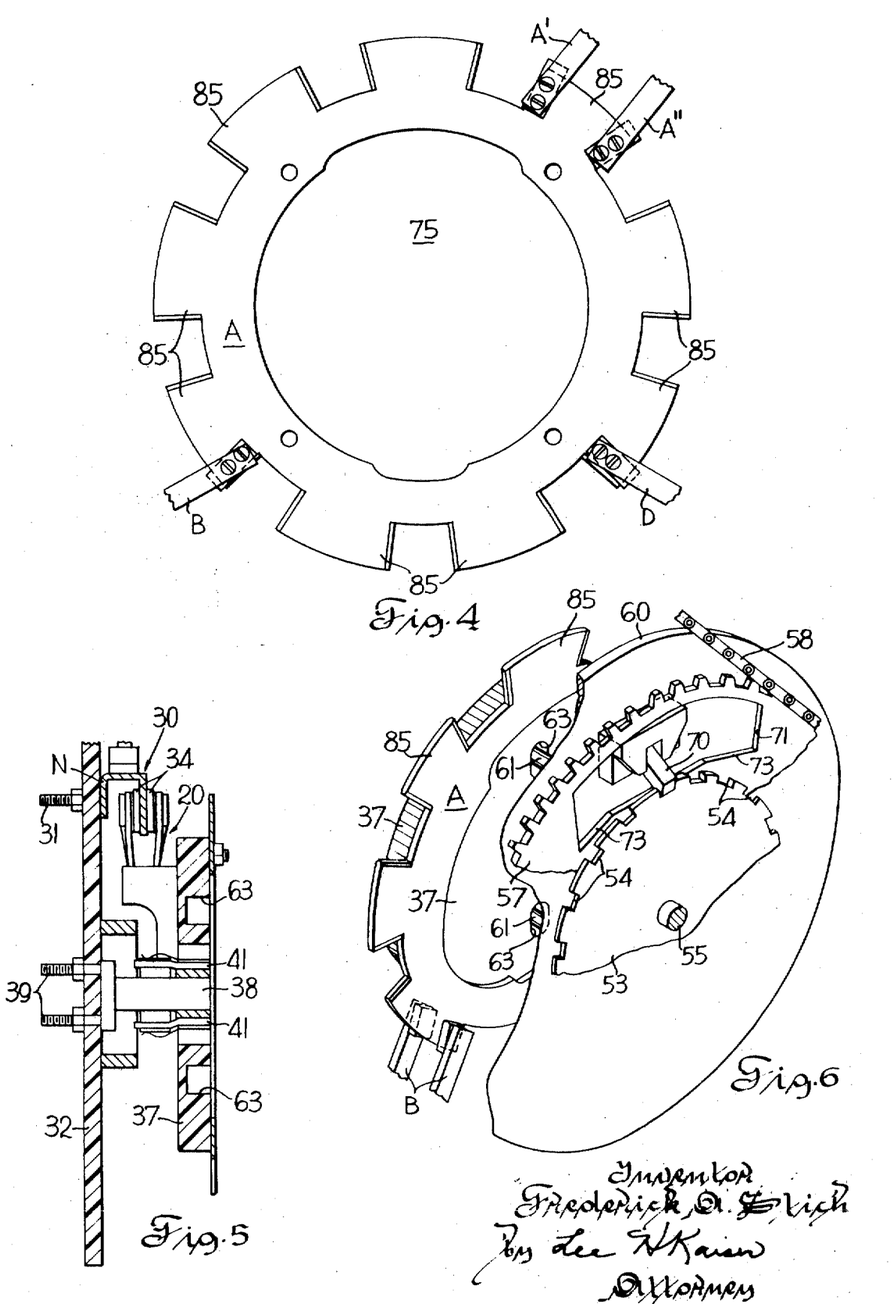
FIG. 4 is a view of the odd-even switch.
FIG. 5 is a partial side view similar to FIG. 3 illustrating a single stationary and a single movable contact.
FIG. 6 is a perspective view illustrating the quick-break mechanism for actuating the rotatable contacts.

The pairs of resilient contacts fingers A° and A'' (which comprise the electrically commoned contacts A of both pairs contacts AB and AD of odd-even switch 75) are affixed to the same metallic contact support 96. Contact support 96 is attached by metallic studs (not shown) which extend through insulating panel 32 and are electrically connected to load-bushing L. Opposed contact fingers A' normally engage opposite sides of a projection 85 of switch plate A and opposed contact fingers A" engage opposite sides of the same projection 85 when rotatable contacts 20 and 21 are on the same tap changer stationary contact. Contact fingers A' and A" are arcuately spaced through an angle greater than that between adjacent projections 85 so that one pair of fingers A" or the other A" is always in engagement with switch plate A even when it is being rotated. Further, contact fingers B and D are arcuately spaced so that contact fingers B engage a radial projection 85 adjacent its trailing edge (assuming the subsequent rotation to be clockwise as seen in FIGS. 2 and 4) while the contact fingers D engage a projection 85 adjacent its leading edge. The angle subtended by each projection 85 is preferably approximately 26° which is greater than the angle through which movable contacts 20 and 21 are rotated during each tap change i.e., approximately 20°, thereby assuring that either contact fingers B or contact fingers D are in engagement with a projection 85 on switch plate A at all times. The stationary contact fingers A', A", B and D cooperate with rotatable switch plate A to form the sets of odd-even contacts shown schematically at AB and AD in FIG. 1, and this structure assures that one set of odd-even switch contacts AB or Ad is always closed so that one load circuit is always completed and the current to load-bushing L is never interrupted.

OPERATION OF ODD-EVEN SWITCH

Figure 7A:
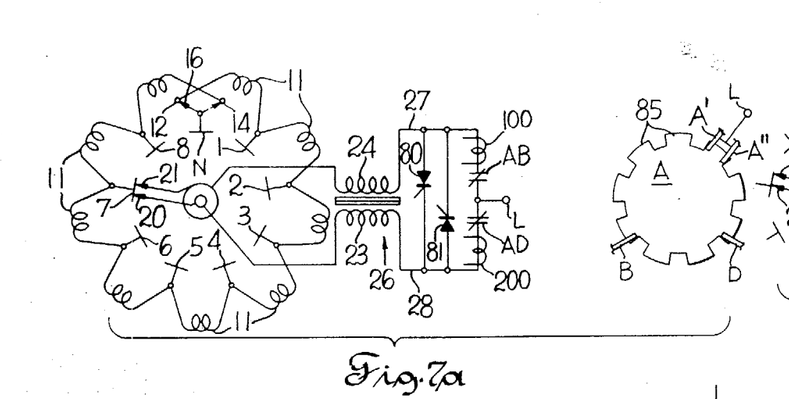
FIGS. 7a through 7f schematically illustrate the sequence of operations in changing taps in the apparatus of FIGS. 1–7.
Figure 7C:
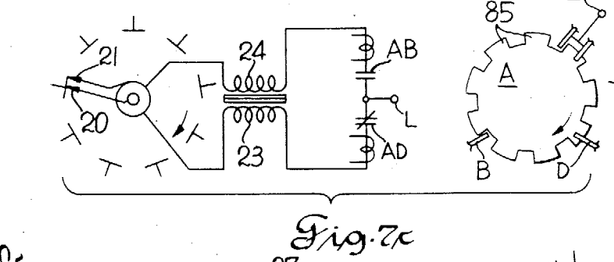
Figure 7D:
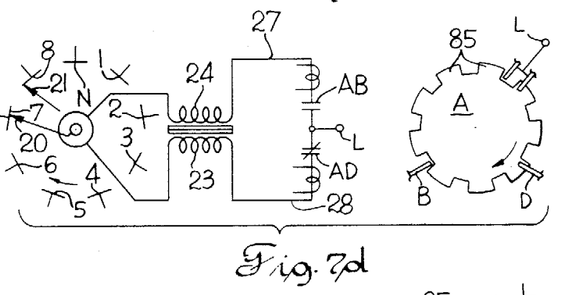

FIGS. 7a–7f schematically illustrate operation of odd-even switch 75. The schematic circuit diagram with the odd-even contacts represented No. is shown at the left of each FIG. 7a–7f and the physical embodiment is shown to he right thereof. FIG. 7a represents that tap changer rotatable contacts 20 and 21 both engage stationary contact 7 and that odd-even switch contact fingers D engage the leading edge of another projection 85 so that both contact pairs AB and Ad are closed. FIG. 7b represents that contact carrier 37 has been rotated sufficiently in a clockwise direction (approximately 5°) to disengage contact fingers B from switch plate A but not far enough to disengage tap change rotatable contact 21 from stationary contact 7, thereby opening odd-even switch contact pair AB as schematically illustrated in the left portion of FIG. 7b. FIG. 7c illustrates that the gating signals to thyristors 80 and 81 are removed after contacts AB open as described hereinafter so that the thyristors 80 or 81 interrupt the current in the second load circuit at current zero and contacts AB do not interrupt current. Since odd-even switch contacts AB are open, movable contact 21 may disengage stationary contact 7 without interrupting current, and rotatable contact 21 disengages stationary contact 7 after approximately 10° of rotation of contact carrier 37. FIG. 7d illustrates that contact carrier 37 has been rotated sufficiently further in the clockwise direction (approximately 16°) to engage rotatable tap changer contact 21 with the succeeding tap changer stationary contact 8 but not sufficiently far to engage odd-even switch finger contacts B with the succeeding radial projection on switch plate A, thereby assuring that the tap change takes place while odd-even switch contacts AB are open and load current is not interrupted by a tap-changer movable contact 21. It will be appreciated that during such sequence of operations, odd-even switch contact fingers D has moved from the leading to the trailing edge of a radial projection 85 but has remained in continuous engagement therewith so that load current flows to load-bushing L through the first load circuit including tap changer rotatable contact 20 and odd-even switch contacts AD while movable contact 21 was being rotated to the succeeding tap changer stationary contact 8.

Figure 7E:
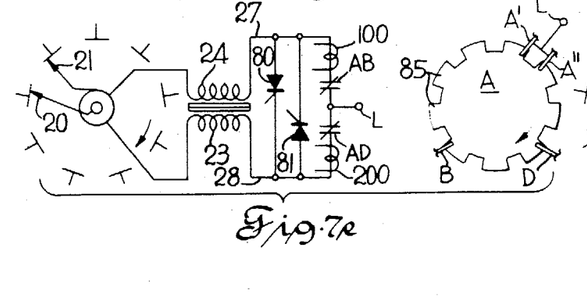

Contact fingers B engage succeeding radial projection 85 on switch plate A after approximately 18° rotation of contact carrier 37 as represented in FIG. 7e to reclose contacts AB. During the tap change finger contacts A" have moved from the leading to the trailing edge of a radial projection 85 but have maintained continuous engagement with this projection 85.

It will be appreciated that in alternative embodiments of the invention, the actuating member 60 can be omitted and the latch means 70 mounted on, and the spring assemblies 65 connected to, an operating member which carries the movable contacts 20 and 21 and switch plate A.

SCR GATING CONTROL

Means responsive to the current flow in both of the load circuits supply triggering signals to SCR's 80 and 81 and are responsive to the opening of either load circuit to remove the triggering signals after a predetermined time delays. The primary winding of a current transformer 100 (see FIG. 1) of gating signal control means 82 is connected in series with conductor 27 and odd-even switch contacts AB, and the primary winding of a current transformer 200 is connected series with conductor 28 and odd-even switch contacts AD. Current transformer 100 has a pair of secondary windings 101 and 102 which are connected to full wave bridge rectifiers 203 and 104 respectively. Similarly current transformer 200 has a pair of secondary windings 201 and 202 which are connected to bridge rectifiers 103 and 204 respectively. Current transformers 100 and 200 provide gating power for SCR's 80 and 81 and also indicate whether the contacts AB and AD of the odd even switch 75 are open or closed.

When odd-even switch contacts AB and AD are closed, bridge rectifier 104 provides gating power over conductors 109 and 110 to SCR 80 and bridge rectifier 204 provides gating power over conductors 209 and 210 to SCR 81. When either pair of odd-even switch contacts AB or AD is opened, gating power is maintained momentarily to both SCR's 80 and 81 for at least one full cycle after the odd-even switch contacts open so that the current carried by the rotatable tap changer contact 20 or 21 being actuated is interrupted by SCR 80 or 81 at the current zero following removal of gating power from the SCR's. Current then flows to load-bushing L through the other load circuit, i.e., through the other rotatable tap changer contact 20 or 21 and the other pair of odd-even switch contacts AB or AD.

A gating current supply capacitor 115 connected in series with resistance 116 across conductors 109 and 110 is charged by bridge rectifier 104 when odd-even switch contacts AB and AD are closed and supplies gating power to SCR 80 after odd-even switch contacts AB open and bridge rectifier 104 is deenergized. Similarly, a gating current supply capacitor 215 connected in series with a resistance 216 across conductors 209 and 210 is charged by bridge rectifier 204 when odd-even switch contacts AB and AD are closed and supplies gating power to SCR 81 after odd-even switch contacts AD opens and bridge rectifier 204 is deenergized.

Industry standards require that a distribution voltage regulator be capable of carrying 64 times rated current under short circuit conditions without failure, for example, 64 times 200 amperes rated current. If a short circuit occurs on the voltage regulator in the condition shown in FIGS. 1 and 7a when both odd-even switch contact pairs AB and AD are closed, the short circuit current flows through the contacts AB and AD of the odd-even switch 75 so that SCR's 80 and 81 are not subjected to short circuit conditions.

The load-tap changing apparatus precisely controls the time interval after opening of odd-even switch contacts AB or AD that gating power is removed from SCR's 80 and 81, thereby minimizing the possibility of subjecting the SCR's to short circuit currents when the odd-even switch contacts AB or AD are open and permitting use of SCR's of lower rating. Timing capacitors 120, 121, 220 and 221 associated with bridge rectifiers 103, 104, 203, and 204 respectively regulate the time interval after opening of an odd-even switch contact pair AB or AD before gating power is removed from SCR's 80 and 81 Timing capacitors 120, 121, 220, and 221 are charged through resistances 125, 126, 225, ad 226 respectively from bridge rectifiers 103, 104 203 and 204 when odd-even switch contact pairs AB and AD are closed.

SHUNT REGULATOR FOR SCR 80

A shunt regulator provided for SCR 80 includes a control element which preferably is a shunting transistor 130 having its emitter-collector junction connected across conductors 109 and 110 a reference voltage zener diode 131 connected across the base-collector junction of shunting transistor 130 and also connected in series with a base resistance 134 across conductors 109 and 110, and a voltage dropping resistance 132 in series with conductor 110 between bridge rectifier 104 and the shunt regulator. The output voltage from the shunt regulator remains constant because the current through shunting transistor 130 changes as the input voltage to the shunt regulator or the gating current changes. The base-collector voltage of shunting transistor 120 is held constance by reference voltage zener diode 131, and thus any change in input voltage from bridge rectifier 104 appears across the base resistance 134 and changes the potential applied to the base-emitter junction of shunting transistor 130 so that its collector current which flows through voltage dropping resistance 132 varies in a direction to maintain the shunt regulator output voltage constant. Change in gating current to SCR 80 vary the voltage drops across a dropping resistor 135 connected between the shunt regulator and the gate of SCR 80, and the shunt regulator in combination with voltage dropping resistor 135 assures that the gate of thyristor 80 never dissipates more than a predetermined amount of power, preferably two watts.

Gating current is maintained to SCR 80 for a least one full cycle after odd-even switch contacts AB or AD open to assure that the current through the tap changer movable contact 20 or 21 being switched is interrupted by SCR 80 (or SCR 81) at current zero and not by the odd-even switch contacts. Timing capacitor 121 assures that gating current flows to SCR 80 for a predetermined interval after contacts AB open, and timing capacitor 120 assures that such gating current to SCR 80 flows for a predetermined interval after contacts AD open.

Shunting transistor 130 is biased in the active region when zener diode 131 breaks down and either a first holding transistor 140 or a second holding transistor 141 is biased ON, thereby permitting gating current to flow over conductors 109 and 110 to SCR 80. When either first- or second-holding transistor 140 or 141 is biased OFF, shunting transistor 130 is biased into saturation and shunts gating current from SCR 80, thereby permitting SCR 80 to interrupt current carried by the tap changer movable contact 20 or 21 at current zero.

When odd-even switch contacts AB and AD are closed, first holding transistor 140 is biased ON by the charge on timing capacitor 120 which is coupled through a diode 142 and a resistance 143 to the base of first holding transistor 140, and second holding transistor 141 is biased ON by the charge on timing capacitor 121 which is coupled through a diode 144 and a resistance 145 to the base of second holding transistor 141.

The collector of first holding transistor 140 is coupled through a resistance 147 to bridge rectifier 104 and timing capacitor 121. When first holding transistor 140 is biased ON, the voltage of bridge rectifier 104 causes current to flow through resistance 147 and the collector-emitter junction of first-holding transistor 140 to conductor 109, and the potential impressed across the base-emitter junction of shunting transistor 130 is determined by the input voltage to the shunt regulator which controls the voltage drop across base resistance 134. Shunting transistor 130 is determined by the input voltage to the shunt regulator which controls the voltage drop across base resistance 134. Shunting transistor 130 is biased OFF until the input voltage to the shunt regulator is sufficiently high to break down zener diode 131. When zener diode 131 conducts, the shunting transistor 130 is biased in the active region so that gating current can flow to SCR 80. When first-holding transistor transistor 140 is biased OFF, the voltage of rectifier bridge 104 (or of timing capacitor 121) causes current to flow through resistance 147, a coupling diode 148 and base resistance 134 to conductor 109, and the increased voltage drop across base resistance 134 biases shunting transistor 130 into saturation which shunts, or cuts off gating current from SCR 80 and rapidly discharges gating current supply capacitor 115.

The collector of second-holding transistor 141 is coupled through a resistance 149 to timing capacitor 120. When second-holding transistor 141 is biased ON, the charge on timing capacitor 120 causes current to flow through resistance 149 and the collector-emitter junction of second-holding transistor 141 to conductor 109. When second-holding transistor 141 is biased OFF, the voltage on timing capacitor 120 causes current to flow through resistance 149, a coupling diode 105, and base resistance 134 to conductor 109, and the increased voltage drop across base resistance 134 biases shunting transistor 130 into saturation to shunt gating current from SCR 80. First and second-holding transistors 140 and 141 together with coupling diodes 148 and 150 may be considered an OR circuit which biases shunting transistor 130 in the active region when either first or second-holding transistors 140 or 141 is ON, thereby permitting gating current to flow to SCR 80.

When odd-even switch contacts AB open, current transformer 100 and bridge rectifier 104 are deenergized, but gating current supply capacitor 115 discharges through the series arrangement of a diode 152, dropping resistance 132, three series diodes 153, 154, and 155, resistance 135, and a diode 157 to supply gating current to SCR 80 after contacts AB open. Further, timing capacitor 121 discharges through diode 144, resistance 145 and a resistance 160 coupled between the base of second holding transistor 141 and conductor 109, and the voltage drop across resistance 160 temporarily keeps second-holding transistor 141 biased ON. The charge on timing capacitor 121 decays, and a predetermined interval after contacts AB open, second holding transistor 141 is biased OFF. The decrease in voltage across timing capacitor 121 as it discharges is reflected through resistance 147 to the collector of first holding transistors 140, thereby biasing it OFF after a predetermined time delay. The biasing of either first or second holding transistors 140 and 141 OFF increases the current through base resistor 134 and thus increases the base-emitter potential applied to shunting transistor 130, thereby biasing it into saturation and shunting gating current from SCR 80. In this manner, the gating current to SCR 80 is clipped, or truncated a predetermined interval, preferably 25 milliseconds, after odd-even switch contacts AB open and also a predetermined interval before the movable tap changer contact disengages the stationary contact. This assures that SCR 80 remains ON after contacts AB open so that contacts AB never interrupt current, and it also assures that the probability of SCR 80 being subjected to fault current when it is gated ON is minimal.

When odd-even switch contacts AD open, current transformer 200 and bridge rectifier 103 are deenergized, but timing capacitor 120 discharges through a diode 142, resistance 143, and a resistance 162 coupled to the base of first holding transistor 140 ON, thereby temporarily biasing firs holding transistor 140 ON. The voltage on timing capacitor 120 decays and first holding transistor 140 is biased OFF a predetermined interval after odd-even switch contacts AD open. The decrease of voltage on timing capacitor 120 is reflected through resistance 149 to the collector of second holding transistor 141 and biases it OFF after a desired time delay. When either first- or second-holding transistors 140 and 141 is biased OFF, the current through base resistance 134 and thus the potential applied to the base-emitter junction of shunting transistor 130 increases and biases it into saturation. When shunting transistor 130 saturates, gating current is shunted from SCR 80 so it interrupts current flowing through tap changer movable contact 20 or 21 at the first current zero. It will be noted that the truncating, or clipping of gating current to SCR 80 occurs a predetermined interval after contacts AD open and also a predetermined interval before the tap changer contacts disengage to assure that the probability is minimal of SCR 80 being subjected to fault current while gated ON.

SHUNT REGULATOR FOR SCR 81

The shunt regulator for SCR 81 is similar to that for SCR 80 and includes a control element which preferably is a shunting transistor 230 having its emitter-collector junction connected across conductors 209 and 210, a reference voltage zener diode 231 connected across the base-collector junction of shunting transistor 230 and also connected in series with a base resistor 234 across conductors 209 and 210 and a voltage dropping resistance 232 in series with conductor 210 between bridge rectifier 204 and the shunt regulator. The voltage from such shunt regulator remains constant because the current through shunting transistor 230 changes as the input voltage to the shunt regulator or the gating current to SCR 81 changes.

The base-collector voltage of shunting transistor 230 is held constant by reference voltage zener diode 231, and thus any change in input voltage from bridge rectifier 204 appears across the vase resistance 234 and changes the potential applied to the base-emitter junction of shunting transistor 230 so that its collector current, which flows through dropping resistance 232, varies in a direction to maintain the shunt regulator output voltage constant. A change in gating current to SCR 81 varies the voltage drop across a dropping resistance 235 connected between the shunt regulator and the gate of SCR 81, and the shunt regulator in combination with dropping resistance 235 assures that the gate of SCR 81 never dissipates more than a predetermined amount of power, preferably two watts.

Gating current is maintained to SCR 81 for at least one full cycle after odd-even switch contacts AB or AD open to assure that the currents is interrupted by SCR 81 (or by SCR 80) and not by the odd-even switch contacts. Timing capacitors 220 and 221 assure that gating current flows to SCR 81 for a predetermined interval after contacts AB and AD respectively open and is cut off a predetermined interval before the tap changer contacts disengage.

Shunting transistor 230 is biased into the active region when zener diode 231 breaks down and either a first-holding transistor 240 or a second-holding transistor 241 is biased ON, thereby permitting gating current to flow over conductors 209 and 210 to SCR 81. When either a first or a second-holding transistor 240 and 241 is turned OFF, shunting transistor 230 is biased into saturation and shunts gating current from SCR 81, thereby permitting SCR 81 to interrupt the current carried by the tap changer movable contact 20 or 21 being rotated at current zero.

When odd-even switch contacts AB and AD are closed, first and second-holding transistors 240 and 241 are biased ON by the charge on timing capacitors 220 and 221 respectively.

When odd-even switch contacts AD open, current transformer 200 and rectifier 204 are deenergized, but gating current supply capacitor 215 discharges through the series arrangement of a diode 252, dropping resistance 232, three series diodes 253, 254 and 255, dropping resistance 235 and a diode 257 to supply gating current to SCR 81 after contacts AD open. Further, timing capacitor 221 discharges through a diode 244, a resistance 245, and a resistance 260 connected to the base of second-holding transistor 241 and also through resistance 247 in series with saturated first-holding transistor 240, and the voltage drop across resistance 260 temporarily maintains second-holding transistor 241 biased ON. The charge on timing capacitor 221 decays, and second-holding transistor 241 is biased OFF a predetermined interval after contacts AD open. The decrease in voltage across timing capacitor 221 is also reflected through resistance 247 to the collector of first-holding transistor 240, thereby biasing if OFF after a time delay. The turning of either first or second-holding transistors 240 or 241 OFF increases the flow of current through base resistance 234 and thus increases the base-emitter potential applied to shunting transistor 230, thereby biasing it into saturation and shunting gating current from SCR 81. The gating current to SCR 81 is thus truncated, or clipped a predetermined interval, preferably 25 milliseconds, after odd-even switch contacts AD open and also a predetermined interval before the tap changer contacts disengage.

When odd-even switch contacts AB open, current transformer 100 and bridge rectifier 203 are deenergized, but timing capacitor 220 discharges through a diode 242, resistance 243 and a resistance 262 connected to the base of first-holding transistor 240, thereby temporarily biasing first-holding transistor 240 ON. The voltage on timing capacitor 220 decays, and first-holding transistor 240 is biased OFF a predetermined interval after odd-even switch contacts AB open. The decrease of voltage on timing capacitor 220 is reflected through a resistance 249 to the collector of second-holding transistor 241 and biases it OFF after a time delay. When either first or second-holding transistors 240 and 241 is biased Off, the current flow through base resistor 234 increases and thus the potential applied to the base-emitter junction of shunting transistor 230 increases and biases it into saturation. When shunting transistor 230 saturates, gating current is shunted from SCR 81 so it (or SCR 80) interrrupts current through the tap changer movable contact 20 or 21 being switched at the next current zero. The truncating, or clipping of gating current to SCR 81 occurs a predetermined interval after contacts AB open and also a predetermined interval prior to disengagement of the tap changer contacts to assure that the probability is minimal that SCR 81 will be subjected to to fault current while gated ON.

OPERATION

Assume the condition shown in FIG. 7a with both tap changer rotatable contacts 20 and 21 engaging tap changer stationary contact 7 and both odd-even switch contacts AB an AD closed. In this condition, the load current flows through both rotatable tap changer contacts 20 and 21, through both preventive autotransformer windings 23 and 24, and both conductors 27 and 28 to load-bushing L so that both current transformers 100 and 200 are energized and both SCR's 80 and 81 are gated ON. If a short circuit occurs on the voltage regulator in the condition shown in FIG. 7a, the short circuit current flows through the odd-even switch contacts AB and AD so that SCR's 80 and 81 are not subjected to short circuit current.

Assume further that the voltage impressed upon load-bushing L is out of the voltage bandwidth and that the regulator control circuit (not shown) energizes motor M to actuate tap changer rotatable contact 21 to the succeeding stationary contact 8. Chain drive 58 rotates sprocket wheel 57 while latch 70 is retained within a notch 54 on index plate 53 to prevent actuating disk 60 and contact carrier 37 from moving, thereby loading one spring assembly 65. After a predetermined rotation of sprocket wheel 57, cam surface 73 on sprocket wheel 57 lifts cam 70 out of its notch 54 in index plate 53 and thus frees actuating disk 60 for rotation. After rotation of contact carrier 37 and switch plate A through a first predetermined angle (approximately 5° and assumed to be clockwise), contact fingers B are disengaged from the corresponding projection 85 on switch plate A, as illustrated in FIG. 7b, thereby opening contacts AB of the odd-even switch 75 at time $t_1$ schematically represented in FIG. 8a before tap changer rotatable contact 21 has disengaged from stationary contact 7. SCR's 80 and 81 are gated ON when odd-even switch contacts AB open at time $t_1$ as represented in FIG. 8b so that the current flowing through the second-load circuit comprising rotatable contact 21, preventive autotransformer winding 24, and conductor 27 is interrupted by SCR 80 or 81 after gating current is removed therefrom and no current is interrupted by odd-even switch contacts AB.

Opening of contacts AB deenergizes current transformer 100 and bridge rectifiers 104 and 203. Capacitor 115 supplies gating current to SCR 80 for an interval after contacts AB open until the charge on timing capacitor 121 decays to the point where first or second holding transistor 140 or 141 becomes biased OFF, thereby biasing shunting transistor 130 into saturation to shunt, or cut off the gating current from SCR 80 at time $t_2$ represented in FIG. 8c after a predetermined time delay subsequent to time $t_1$, preferably 25 milliseconds, which is precisely controlled so that an SCR 80 or 81 interrupts the current through movable contact 21 at the following current zero represented at time $t_3$ in FIG. 8b rather than odd-even switch contacts AB but is sufficiently short to assure that the probability is minimal of SCR's 80 or 81 being subjected to excessive current when they are gated ON. Similarly, bridge rectifier 204 supplies gating current to SCR 81 for an interval after contacts AB open until the charge on timing capacitor 220 decays to the point where higher first or second-holding transistor 240 or 241 is biased OFF, thereby biasing shunting capacitor 230 into saturation to shunt, or clip the gating current to SCR 81 at time $t_2$ which occurs a predetermined interval after odd-even switch contacts AB open and also a predetermined interval before movable contact 21 disengages stationary contact 7.

FIG. 7c represents the condition wherein odd-even switch contact fingers B have disengaged from switch plate A to open odd-even switch contacts AB and gating power has been removed from SCR's 80 and 81 so that current no longer flows through the second load circuit including tap changer movable contact 21, preventive autotransformer winding 24, and conductor 27 but does flow to load-bushing L through the first load circuit including tap changer rotatable contact 20, preventive autotransformer winding 23, and contacts AD of the odd-even switch. Springs 65 continue to rotate contact carrier 37, and movable contact 21 disengages stationary contact 7 after approximately 10° of rotation at time $t_4$ represented in FIG. 8c. After approximately 16° of rotation of contact carrier 37, the tap changer rotatable contact 21 engages stationary contact 8 as represented in FIG. 7d at time $t_5$ represented in FIG. 8c, and at this position the succeeding projection 85 of switchplate A has not yet engaged finger contacts B of the odd-even switch, thereby assuring that no arcing occurs at tap changer stationary contact 8 and rotatable contact 21.

Figure 8A:
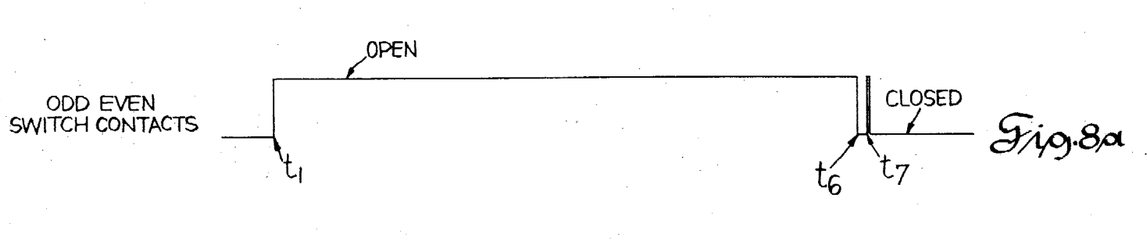
Figure 8B:
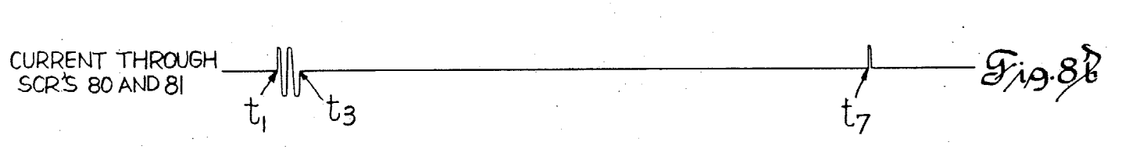
Figure 8C:
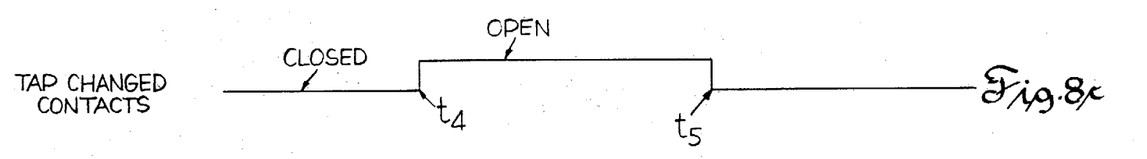
Figure 8D:
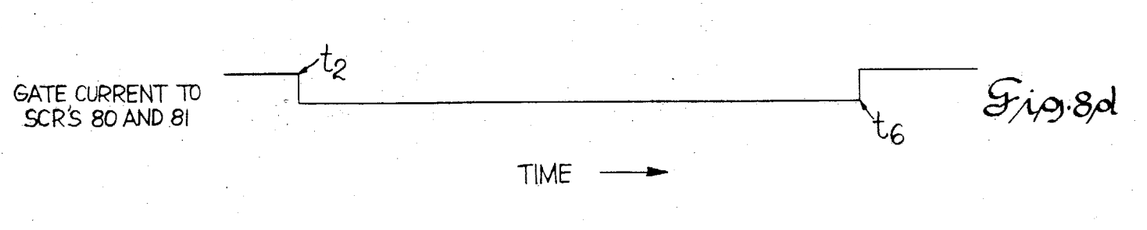

Rotation of contact carrier through approximately 18° by load springs 65 engages the succeeding projection 85 on switchplate A with finger contacts B at time $t_6$ represented in FIG. 8a, thereby closing odd-even switch contacts AB subsequent to the tap change as represented in FIG. 7e. Closing of odd-even switch contacts AB energizes current transformer 100 and bridge rectifiers 103 and 104. Energization of bridge rectifier 104 immediately develops voltages across capacitor charging resistances 116 and 126. The voltage across resistance 116 causes gating current to flow to SCR 80 even though capacitor 115 is not charged. The potential across resistance 126 biases first and second-holding transistors 140 and 141 ON. Turning of first and second-holding transistors 140 and 141 ON biases shunting transistor 130 in the active region and permits gating current to flow to SCR 80. Capacitors 115 and 121 then charge through resistances 116 and 126 respectively.

Energization of bridge rectifier 203 immediately develops a voltage across capacitor charging resistance 225 which biases first- and second-holding transistors 240 and 241 ON even through timing capacitor 220 is not charged. Turning first- and second-holding transistors 240 and 241 ON reduces current flow through base resistance 234 to decrease the base-emitter bias on shunting transistor 230 so that it operates in the active region and permits gating current from bridge rectifier 204 to flow to SCR 81. Timing capacitor 220 then charges through resistance 225.

It will thus be appreciated that closure of odd-even switch contacts AB rapidly restores gating current to SCR's 80 and 81 so that they will conduct as represented in FIG. 8b if contact bounce occurs (at time $t_7$ as represented in FIG. 8a) and will prevent erosion of the odd-even switch contacts due to arcing. The first or second load circuit being switched is always inductive because of the reactor winding 23 or 24, and it will be appreciated that the opening of a switch in an inductive circuit is much more damaging to the contacts than closure thereof. Inasmuch as SCR's 80 and 81 commutate off at current zero subsequent to opening of the odd-even switch contacts, no inductive energy exists which can cause arcing and contact erosion. The initial current flow when odd-even contacts AB reclose is substantially zero. However, if the odd-even switch contacts should bounce after the current has built up, SCR's 80 and 81 are gated on and interrupt the current to prevent destructive arcing at the odd-even switch contacts.

As shown in FIG. 7e, contact fingers D engage the trailing edge of the same projection 85 on switch plate A that they engaged in the condition represented in FIG. 7a thereby assuring that the flow of load current to load-bushing L through the first load circuit is continuous.

Figure 7F:
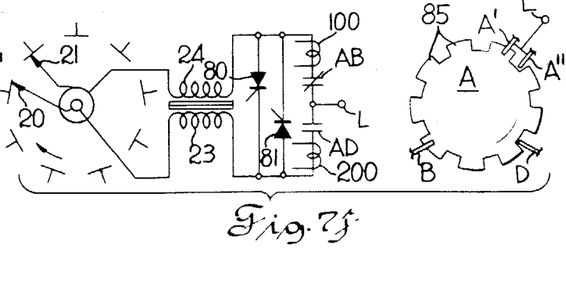
Figure 7G:
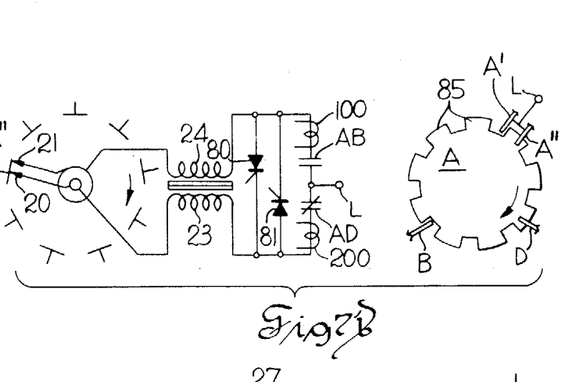

Assuming that the voltage supplied to load-bushing L is still beyond the voltage bandwidth, motor M will continue to drive chain 58 and sprocket wheel 57 in a direction to actuate tap change rotatable contact 20 into engagement with stationary contact 8, and FIG. 7f illustrates the condition wherein latch 70 has been lifted by cam surface 73 from its notch 54 in index plate 53 and the loaded springs 65 have rotated contact carrier 37 and switch plate A sufficiently to disengage projection 85 on switch plate A from finger contacts D to open odd-even switch contacts AD before tap changer contact 20 has disengaged stationary contact 7. Opening of odd-even switch contacts AD deenergizes current transformer 200 and rectifier bridges 103 and 204. Bridge rectifier 104 supplies gating current over conductors 109 and 110 to SCR 80 until the charge on timing capacitor 120 decays to the point where first- or second-holding transistor 140 or 141 is biased OFF, thereby biasing shunting transistor 130 into saturation to shunt, or cut off gating current from SCR 80 a predetermined interval after contacts AD open and also assuring that odd-even switch contacts AD do not interrupt load current and that the chances of subjecting SCR 80 to a short circuit current while it is gated ON are minimal.

Similarly, gating current supply capacitor 215 supplies gating current to SCR 81 over conductors 209 and 210 until the charge on timing capacitor 221 decays to the point where either first- or second-holding transistors 240 or 241 is biased OFF, thereby biasing shunting transistor 230 into saturation to shunt, or clip gating current from SCR 81 a predetermined interval after contacts AD open. SCR 80 commutates off after contacts AD open if the load current is negative and SCR 81 commutates off after contacts AD if the load current is positive. Tap changer rotatable contact 20 is then free to rotate into engagement with stationary contact 8 without arcing (not shown in FIG. 7) since the first load circuit through it and conductor 28 is open at odd-even switch contacts AD. Further, since tap changer rotatable contact 20 is not carrying current when it is moved from stationary contact 7 to stationary contact 8, it is not necessary to snap it to the succeeding contact with a quick-break mechanism, and rather it may be actuated at any desired speed without arcing.

The series arrangement of two avalanche diodes 82 and 83 and a power resistor 84 is preferably connected across thyristors 80 and 81 to limit high-frequency transient voltages across the thyristors.

An assembly of a spark gap 97 in series with a resistance 98 is connected across the series arrangement of odd-even switch contacts AB and AD. If a transient triggers spark gap 97, the resulting current flows through the primary winding of current transformers 100 and 200. If the transient being suppressed has substantial energy, SCR's 80 and 81 will be grated ON in the manner described above, and the transient will be absorbed in the copper resistances of the inductive components of the regulator.

It will be appreciated that the disclosed snap acting mechanism (provided by springs 65, latch 70 and cam surface 73) is not necessary to prevent arcing between the tap changer movable and stationary contacts since the oppositely poled thyristors 80 and 81 connected across the tap changer movable contacts 20 and 21 interrupt the current in the load circuit being with after the odd-even switch contacts open and before the movable contact 20 or conducting is disengaged from the stationary contact. Further, the invention is operable with any quick-break mechanism wherein the time interval between the opening of the odd-even switch contacts and the subsequent opening of the tap changer contacts is greater than one half cycle.

In certain alternative embodiments of the invention, the controllable semiconductor means is a bidirectional thyristor device (best known by the trademark TRIAC) instead of the pair of oppositely poled SCR's 80 and 81, while in other alternative embodiments such controllable semiconductor means comprise a bridge rectifier and a single-unidirectional thyristor with its anode and cathode electrodes connected in circuit relation conducting the bridge rectifier such that the thyristor is poled in the conducitng direction during both positive and negative alternations of the alternating current.

It will also be appreciated that the disclosed invention can be used with any load-tap changing apparatus having load transfer switches instead of the disclosed odd-even switch 75 to disconnect transfer of the rotatable tap changer contacts from the load before it is disengaged from the stationary contact and reconnect it with the load only after it engages the succeeding stationary contact.

The control current transformers 100 and 200 saturate at moderate current levels in the load circuits so that power dissipation in the control circuits is limited and also to assure that the average voltage across the timing and the storage capacitors does not exceed a predetermined magnitude. Each of the timing and storage capacitors in conjunction with its series resistor forms a low-pass filter which functions to average the capacitor voltage.

It should be understood that I do not intend to be limited to the particular embodiment of the invention shown and described for many modifications and variations thereof will be obvious to those skilled in the art.

The embodiments of the invention in which an exclusive property or privilege is claimed are defined as follows:

1. In a voltage regulator, the combination of a tap changer switch having a plurality of stationary contacts and first and second movable contacts adapted to sequentially engage said stationary contacts in both bridging and nonbridging positions, switch means having first and second pairs of normally closed contacts associated with and connected in series with said first and second movable contacts respectively with both connected to a load terminal forming first and second load circuits and having means to open each of said first and second pairs of contacts before its associated rotatable contact disengages from a stationary contact and to reclose it after said rotatable contact engages a succeeding stationary contact, controllable semiconductor means connected between said first and second load circuits, and means responsive to current flow in both of said load circuits for supplying a triggering signal to said semiconductor means and being responsive to the opening of either of said load circuits for removing said triggering signal after a predetermined time delay.

2. In a voltage regulator in accordance with claim 1 wherein said means for supplying a triggering signal includes first and second current transformers having their primary windings connected in said first and second load circuits respectively.

3. In a voltage regulator in accordance with claim 2 wherein said means for removing said triggering signal includes RC time delay means for connecting a low-impedance shunt across the input circuit to said controllable semiconductor means a predetermined interval after higher said first or said second current transformer is deenergized.

4. In a voltage regulator in accordance with claim 1 wherein said means for supplying a triggering signal and removing if after a time delay includes means coupled to at least one of said load circuits for deriving said triggering signal when current is flowing therein, means including a capacitor in series with a resistor connected to be charged from said signal deriving means and to supply said triggering signal after deenergization of said signal-deriving means, and means for cutting off said-triggering signal when the charge on said capacitor decays to a predetermined magnitude.

5. In a voltage regulator in accordance with claim 4 wherein said signal-deriving means includes transformer means and rectifier means coupled to at least one secondary winding of said transformer means, and said means for supplying a triggering signal also includes shunt voltage regulator means between said rectifier means and the input triggering circuit to said controllable semiconductor means and having a control element controllable semiconductor device in shunt to said input triggering circuit and wherein said means for cutting off said triggering signal biases said semiconductor device into saturation to cut off said triggering signal.

6. In a voltage regulator in accordance with claim 1 and including a reactor having first and second windings connected in said first and second load circuits respectively between said first and second movable contacts and the associated first and second pairs of switch means contacts.

7. In a voltage regulator in accordance with claim 1 wherein said controllable semiconductor means comprises a pair of oppositely pole thyristors and said means for applying a triggering signal supplies gating signals to both said thyristors.

8. In a voltage regulator in accordance with claim 1 wherein said stationary contacts are arranged in a circle and said movable contacts are rotatable and said tap changer switch has a rotatable member operatively connected to said first and second rotatable contacts and said rotatable member also controls opening and closing of said first and second pairs of contacts of said switch means.

9. In a voltage regulator in accordance with claim 8 wherein said switch means includes a conductive switch plate having plurality of arcuately spaced radial projections and said rotatable member carries said first and second rotatable contacts and also carries said switch plate.

10. In a voltage regulator in accordance with claim 2 wherein said means for supplying a triggering signal also includes rectifier means between a secondary winding of at least one of said current transformers and the input-triggering circuit of said controllable semiconductor means and means including a capacitor in series with a resistor connected to be charged by said rectifier means for supplying said triggering signal for said predetermined time delay after opening of either of said load circuits.

11. In a voltage regulator in accordance with claim 10 wherein said means for removing said triggering signal includes triggering signal cutoff means for connecting a low-impedance shunt across the triggering input circuit of said controllable semiconductor means and means including-timing capacitor means for disabling said triggering signal cutoff means both when said rectifier means is energized an also when the voltage on said capacitor is above a predetermined magnitude.

12. In a voltage regulator in accordance with claim 7 wherein said means for supplying-gating signals also includes rectifier means between a secondary winding of at least one of said current transformers and the cathode-gate junctions of said thyristors and means including a capacitor in series with a resistor connected to be charged by said rectifier means for supplying-gating signals to said cathode-gate junctions for said predetermined time delay after opening of either of said load circuits.

13. In a voltage regulator in accordance with claim 12 wherein said rectifier means includes a plurality of bridge rectifiers and said means for supplying-gating signals after opening of either load circuit includes first and second storage capacitors each of which is connected in series with a resistor and to be charged by one of said bridge rectifiers, and said means for removing said gating signals includes gating signal cutoff means responsive to the deenergization of either of said first or said second current transformer for connecting a low-impedance shunt across the cathode-gate junction of each of said thyristors said predetermined time delay after said deenergization.

14. In a voltage regulator in accordance with claim 13 wherein said gating signal cutoff means includes first and second RC time delay circuit means associated with each of said thyristors and including the series arrangement of a resistor and a timing capacitor and being connected to be charged from bridge rectifiers energized from secondary windings of said first and second current transformers respectively, said gating signal cutoff means being operable to connect said low-impedance shunt in response to the decay of the voltage across the timing capacitor of said first or said second RC circuit means to a predetermined magnitude incident to the deenergization of the corresponding current transformer.

15. In a voltage regulator in accordance with claim 14 wherein said means for supplying a triggering signal includes a shunt voltage regulator between the cathode-gate junction of each of said thyristors and one of said bridge rectifiers having a control element transistor in shunt to said cathode-gate junction, and said gating signal cutoff means is operable to bias said control element transistor of each said shunt regulator into saturation.

16. In a voltage regulator in accordance with claim 1 and including the series arrangement of a protective spark gap and a resistance connected across the series arrangement of said first and second pairs of switch means contacts, whereby said controllable semiconductor means is triggered into conduction if a transient occurs having sufficient energy to break down said protective spark gap.

17. In a voltage regulator in accordance with claim 10 wherein said means for supplying a triggering signal includes shunt voltage regulator means between said rectifier means and said input triggering circuit of said controllable rectifier means to limit the power dissipation in said input triggering circuit.

18. In a voltage regulator in accordance with claim 17 wherein said shunt regulator means includes a control element transistor in shunt to said input triggering circuit of said controllable semiconductor means and said capacitor means includes RC time delay means for biasing said control element transistor into saturation said predetermined delay after deenergization of either said first or said second current transformer.

19. In a voltage regulator, the combination of a tap changer switch having a plurality of stationary contacts and first and second movable contacts adapted to sequentially engage said stationary contacts in both bridging and nonbridging positions and to alternately move between stationary contacts, switch means having first and second pairs of normally closed contacts associated with and connected in series with said first and second movable contacts respectively forming first and second load circuits and having means to open each of said first and second pair of contacts before its associated movable contact disengages from a stationary contact and to reclose it after said movable contact engages a succeeding stationary contact, controllable semiconductor means connected between said first and second load circuits, and means for applying a triggering signal to said controllable semiconductor means when said first and second pairs of switch means contacts are both closed and for removing said triggering signal a predetermined interval after either of said pairs of switch means contacts opens, whereby said controllable semiconductor means interrrupt current in said load circuits at current zero and said movable contacts and said switch means contacts never interrupt current.

20. In a voltage regulator in accordance with claim 19 wherein said means for applying a triggering signal includes means coupled to at least one of said load circuits for deriving said triggering signal when current is flowing in said one load circuit, means including a capacitor in series with a resistor connected to be charged from said signal deriving means and to supply said triggering signal to said semiconductor means after deenergization of said signal deriving means, and means responsive to the opening of either of said pairs of switch means contacts for cutting off said triggering signal to said semiconductor means when the charge on said capacitor decays to predetermined magnitude.

21. In a voltage regulator in accordance with claim 20 wherein said signal deriving means includes transformer means and rectifier means between a secondary winding of said transformer means and the input triggering circuit to said controllable semiconductor means.

22. In a voltage regulator in accordance with claim 21 wherein said means for applying a triggering signal also includes shunt voltage regulator means between said rectifier means and said input triggering circuit and having a control element controllable semiconductor device in shunt to said input triggering circuit and wherein said means for cutting off said triggering signal biases said semiconductor device into saturation to cut off said triggering signal.

23. In the combination of claim 19 wherein said first and second pairs of switch means contacts are both connected to a load terminal and including a reactor having first and second windings connected in said first and second load circuits respectively between said first and second movable contacts and the associated first and second pairs of switch means contacts.

24. In the voltage regulator of claim 19 wherein said means for applying a triggering signal includes first and second current transformers having primary windings connected in said first and second load circuits respectively.

25. In the voltage regulator of claim 24 wherein said controllable semiconductor means comprises a pair of oppositely poled thyristors and said means for applying a triggering signal includes rectifier means between a secondary winding of at least one of said current transformers, and the cathode-gate circuits of said thyristors and means including a capacitor in series with a resistor connected to be charged by said rectifier means for supplying gating signals to said cathode-gate circuits of said thyristors for said predetermined interval after deenergization of either of said current transformers.

26. In the voltage regulator of claim 25 wherein said rectifier means includes a plurality of bridge rectifiers and said means for supplying gating signals also includes a shunt voltage regulator between the cathode-gate circuit of each thyristor and one of said bridge rectifiers and having a control element controllable semiconductor device in shunt to said cathode-gate circuit.

27. In the voltage regulator of claim 26 wherein first and second of said bridge rectifiers are energized from secondary windings of said first and second current transformers respectively and said means for supplying gating signals also includes OR circuit means for biasing said semiconductor devices in the active region when said first and second bridge rectifiers are energized and for biasing them in saturation after said predetermined time delay when either said first or said second bridge rectifier is deenergized.

28. In the voltage regulator of claim 27 wherein said means for biasing said semiconductor devices includes, for each said thyristor, first and second holding transistors and OR circuit means for biasing the semiconductor device associated therewith in the active region when both said holding transistors are conducting and for biasing it into saturation when either holding transistor is cut off.

29. In the voltage regulator of claim 28 wherein said means for biasing said semiconductor devices includes, for each said thyristor, first and second RC means including a timing capacitor in series with a resistor energized from said first and second bridge rectifiers respectively for forward biasing said first- and second-holding transistors respectively and for maintaining said forward bias after the corresponding bridge rectifier is deenergized until the voltage on the timing capacitor decays to a predetermined magnitude.